No. 692,086. Patented Jan. 28, 1902.
J. W. STEPHENSON.
CAR AXLE BOX.
(Application filed Aug. 20, 1900.)
(No Model.) 4 Sheets—Sheet 1.

WITNESSES INVENTOR

No. 692,086. Patented Jan. 28, 1902.
J. W. STEPHENSON.
CAR AXLE BOX.
(Application filed Aug. 20, 1900.)
(No Model.) 4 Sheets—Sheet 2.
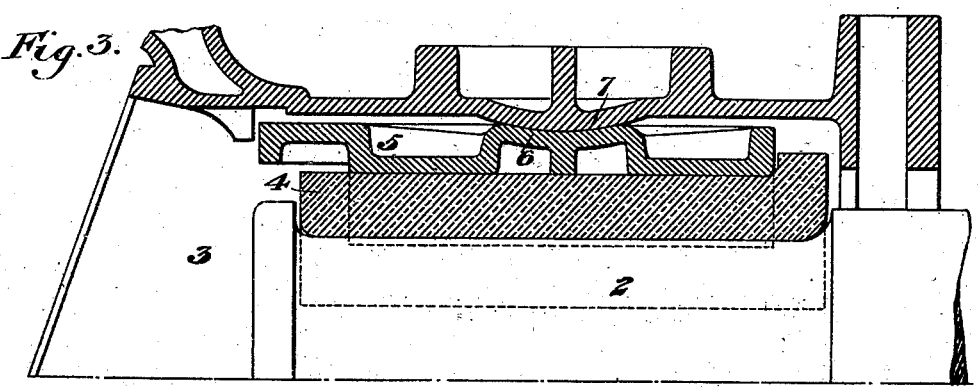
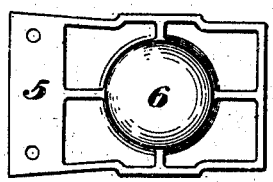
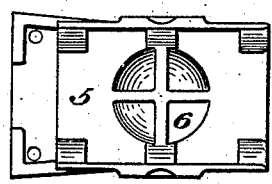
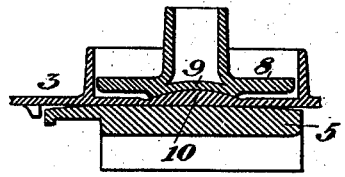
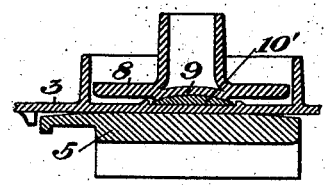
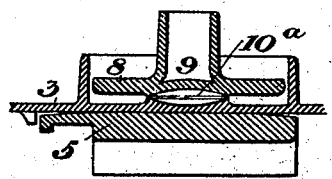
WITNESSES
Thomas W. Bakewell
Lendell A. Conner
INVENTOR
John W. Stephenson No. 692,086. Patented Jan. 28, 1902.
J. W. STEPHENSON.
CAR AXLE BOX.
(Application filed Aug. 20, 1900.)
(No Model.) 4 Sheets—Sheet 3.

WITNESSES INVENTOR

No. 692,086. Patented Jan. 28, 1902.
J. W. STEPHENSON.
CAR AXLE BOX.
(Application filed Aug. 20, 1900.)
(No Model.) 4 Sheets—Sheet 4.

WITNESSES
Thomas W. Bakewell
Lendell A. Connor

INVENTOR
John W. Stephenson

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

CAR-AXLE BOX.

SPECIFICATION forming part of Letters Patent No. 692,086, dated January 28, 1902.

Application filed August 20, 1900. Serial No. 27,385. (No model.)

*To all whom it may concern:*

Be it known that I, JOHN W. STEPHENSON, of Toledo, in the county of Lucas and State of Ohio, have invented a new and useful Improvement in Car-Axle Boxes, of which the following is a full, clear, and exact description, reference being had to the accompanying drawings, forming part of this specification, in which—

Figure 1:
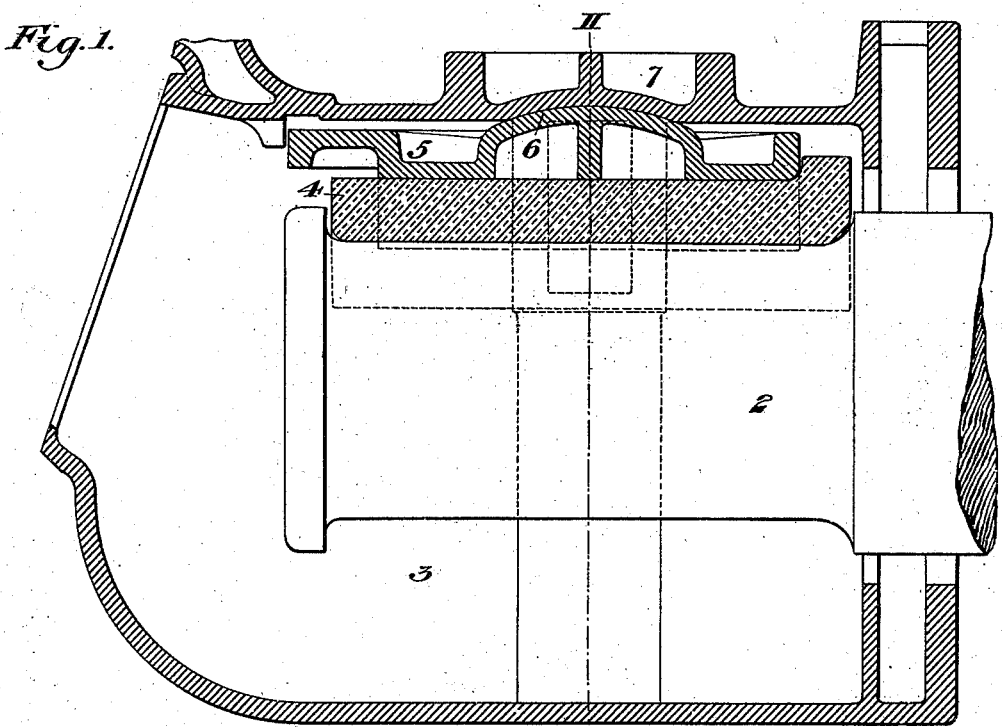
Figure 2:
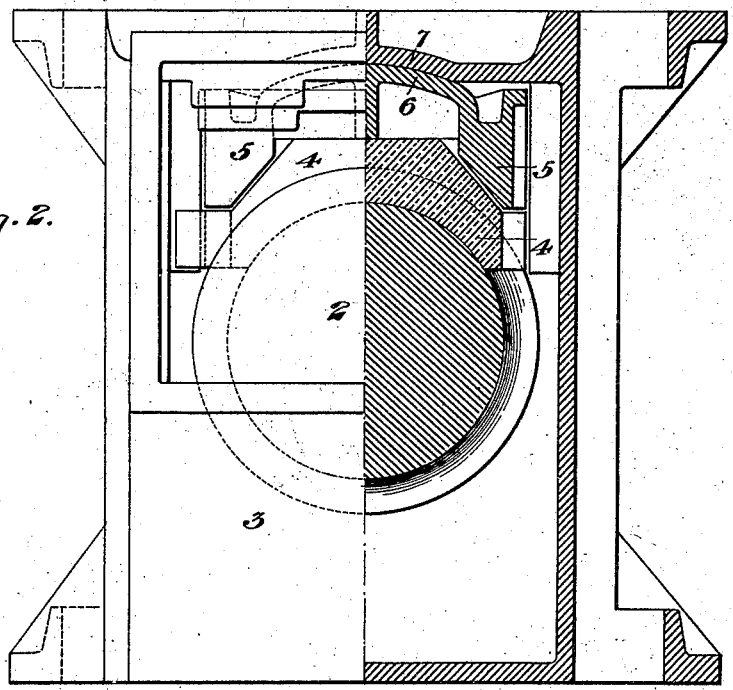
Figure 6:
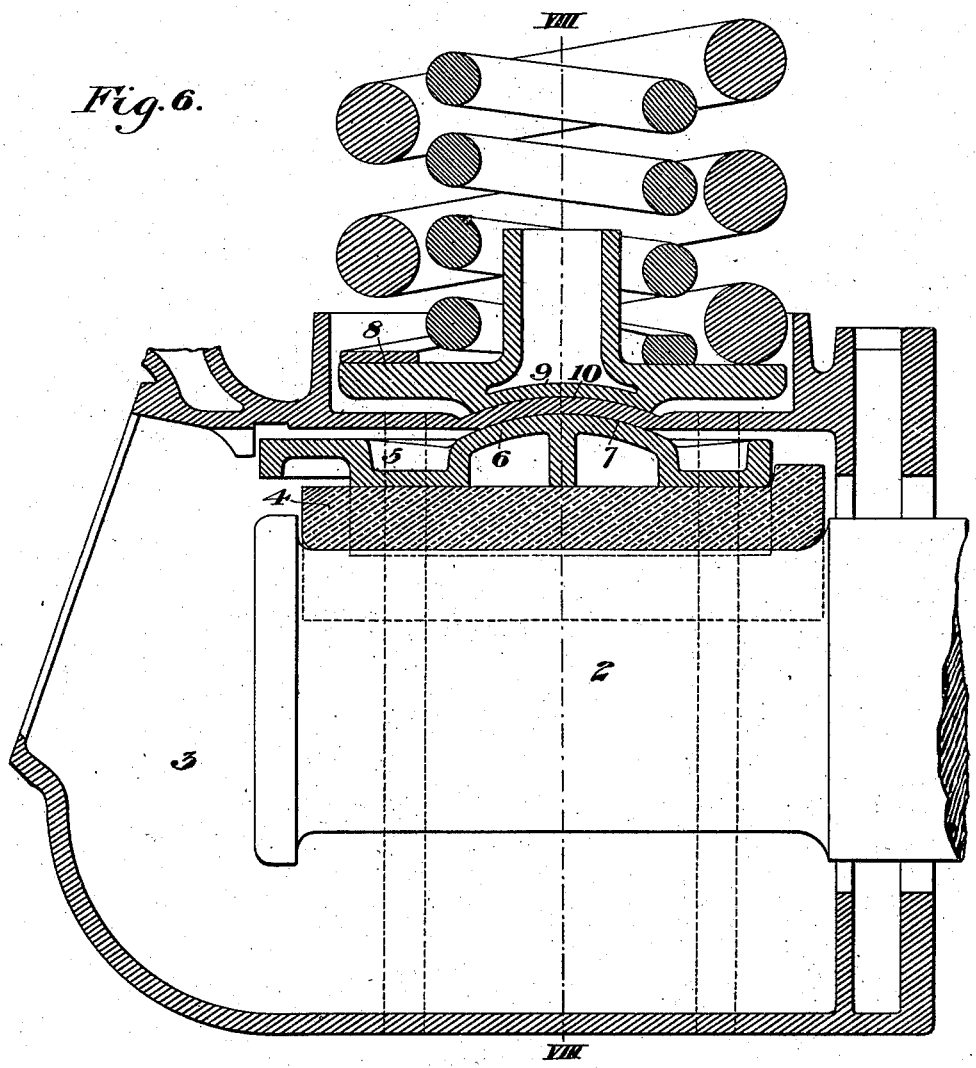
Figure 7:
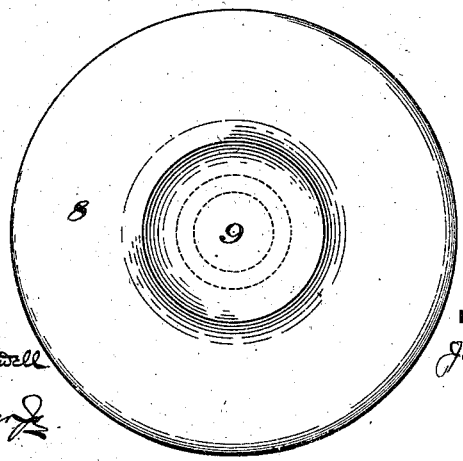
Figure 8:
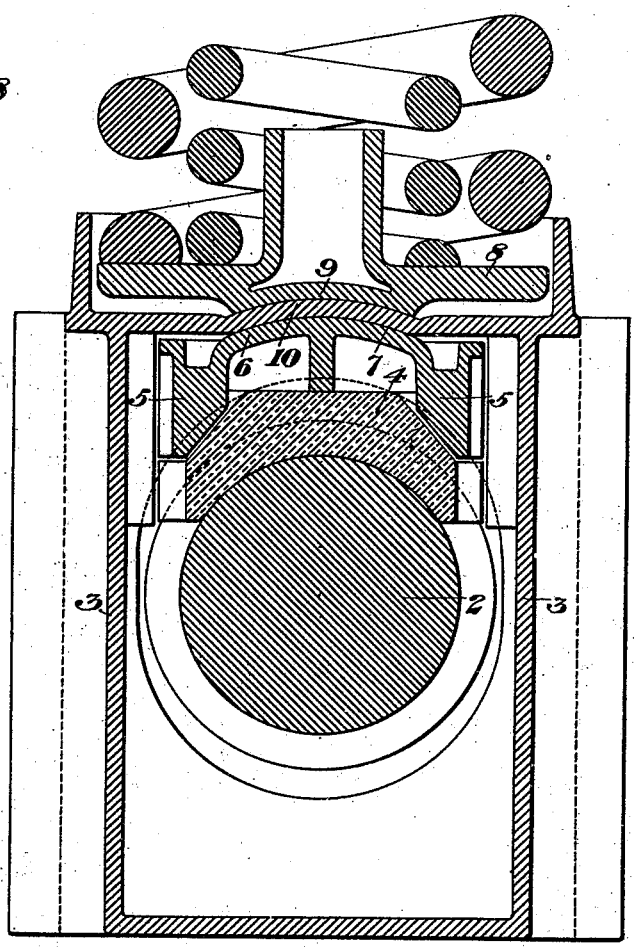

Figure 1 is a longitudinal section of an axle-box constructed in accordance with my invention. Fig. 2 is an end view showing the half at the left in elevation and the right half in cross-section on the line II II of Fig. 1. Fig. 3 is a longitudinal section of a portion of an axle-box, showing a modified form of the wedge. Fig. 4 is a top plan view of the wedge of Figs. 1 and 2. Fig. 5 is a bottom plan of the same. Fig. 6 is a longitudinal section similar to Fig. 1, showing in addition thereto an equalizing spring-seat. Fig. 7 is a bottom plan view of the spring-seat. Fig. 8 is a cross-section on the line VIII VIII of Fig. 6. Figs. 9, 10, 11, and 12 are vertical sectional views showing modified constructions of the bearing of the spring-seat.

The object of my invention is to provide efficient means for maintaining the vertical bearing of the load upon the center of the car-axle and preventing the binding of the bearings upon the journals and the uneven wear and heating of the parts which are caused thereby. These evils unless prevented are serious, because they produce dangerous and destructive wear of the journals and journal bearings or brasses and require the use of an excessive amount of lubricant. Attempts heretofore made to remedy such evils have been to a large degree unsatisfactory; but by my invention they are overcome by means which are simple in nature and thoroughly efficient in operation and which in the preferred form of my invention can be applied to brasses or journal-bearings of ordinary construction.

My invention consists in a journal-box having a universal rocking bearing between the box and the wedge, so that the wedge can adjust itself to correct any uneven fitting of the parts or any unevenness in the bearing of the load. By forming the rocking bearing between the wedge and the box it is removed to a considerable distance above the axle and is thus rendered thoroughly efficient, whereas if the rocking bearing were formed between the wedge and the brass the shortness of the radius between the said bearing and the axle in such case would largely destroy its utility.

My invention also consists in a spring-seat constituted by a plate or piece having a rocking bearing on the box, so that if by reason of breaking of the spring or unsymmetrical shape of the spring or unevenness of the surface of the spring-seat the spring does not bear centrally upon the seat the seat will adjust itself and will thus contribute to the desired results which I have stated above.

Within the scope of my invention the form and construction of the parts of my improved device may be varied in many ways; but I will now describe what I consider to be the preferred forms thereof.

In Fig. 1, 2 represents the axle of a car. 3 is the journal-box. 4 is the brass or journal-bearing, which may be of ordinary construction, and 5 is the wedge which is interposed between the top of the box and the brass. This wedge instead of having a flat bearing against the box, as heretofore, has a universal rocking bearing constituted by a convex protuberance 6 on the wedge fitting a concave seat 7 on the box, or the convexity may be on the box and the concavity on the wedge. If now the wedge should fit the box or the brass unevenly, instead of causing the brass to bind upon the journal of the axle the wedge will adjust itself on the rocking bearing constituted as just described, so as to produce accurate parallelism between the brass and the journal, and thus transmit the load to the axle centrally and prevent heating and wear. The considerable distance between the rocking bearing and the axle gives a long radius, which enables the parts to adjust themselves accurately, and thus to effect results which would not be accomplished if the said radius were short. Where the box is set between pedestals, the construction just described also enables the box to adjust itself into a perfectly vertical position, and thus prevents wearing of the box, which results when, having no such adjustment, it is canted laterally and binds against the pedestals.

In Fig. 3 I show a construction similar to Fig. 1, except that the concavity is formed on the wedge and the convexity on the box.

Figure 9:
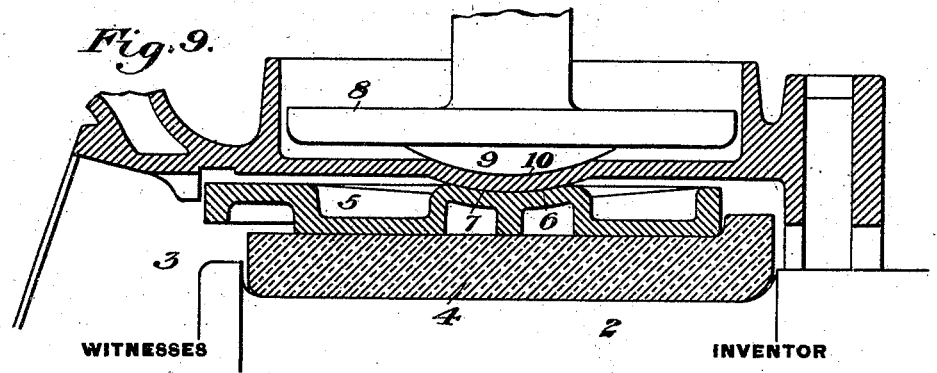

In Figs. 6 and 8 I show a box having the construction above described and having for the same purpose a rocking bearing between a spring-seat and the box. On the top of the box, which is of the kind adapted to receive a spring on its upper surface, is set a plate or seat 8, having an upwardly-extending projection adapted to fit within the coil of a spring and having on its under side a concavity 9, in which a convex protuberance 10 on the box fits, or the concavity may be on the box and the convexity on the spring-seat, as shown in Fig. 9. The spring-seat therefore has a universal rocking bearing on the box and can adjust tself in any direction. This gives a double adjustment, for if the spring should be broken or its lower end be uneven instead of transmitting the load unevenly to the box the spring-seat will adjust itself to fit the spring accurately and will thus transmit the load vertically to the center of the axle.

In Fig. 10 I show a construction in which the rocking spring-seat 8 is applied to a box having a wedge 5 with a flat non-rocking bearing against the box.

In Fig. 11 I show a construction in which the convex protuberance on the box is constituted by a separate piece 10', set in a socket on the top of the box, and in Fig. 12 I show such separate piece 10$^a$ made convex on both sides and fitting in concave seats both on the spring-seat and on the box.

Other modifications may be made by the skilled mechanic, since

I claim—

1. The combination of a journal-box, a wedge, one of which parts has a projection bearing upon the other and constituting a universal rocking bearing, and a journal-brass; substantially as described.

2. The combination of a journal-box, a wedge, one of which parts has a ball-shaped projection bearing upon the other and constituting a universal rocking bearing, and a journal-brass; substantially as described.

3. In combination with a journal-box, a spring-seat having an upwardly-extending projection adapted to fit within the coil of a spring, and having a universal rocking bearing on the box; substantially as described.

In testimony whereof I have hereunto set my hand.

JOHN W. STEPHENSON.

Witnesses:
THOMAS W. BAKEWELL,
G. I. HOLDSHIP.